Feb. 2, 1965 C. W. REI, JR 3,168,346
PULL-UP ARM REST FOR VEHICLE SEATS
Filed May 13, 1963 3 Sheets-Sheet 1
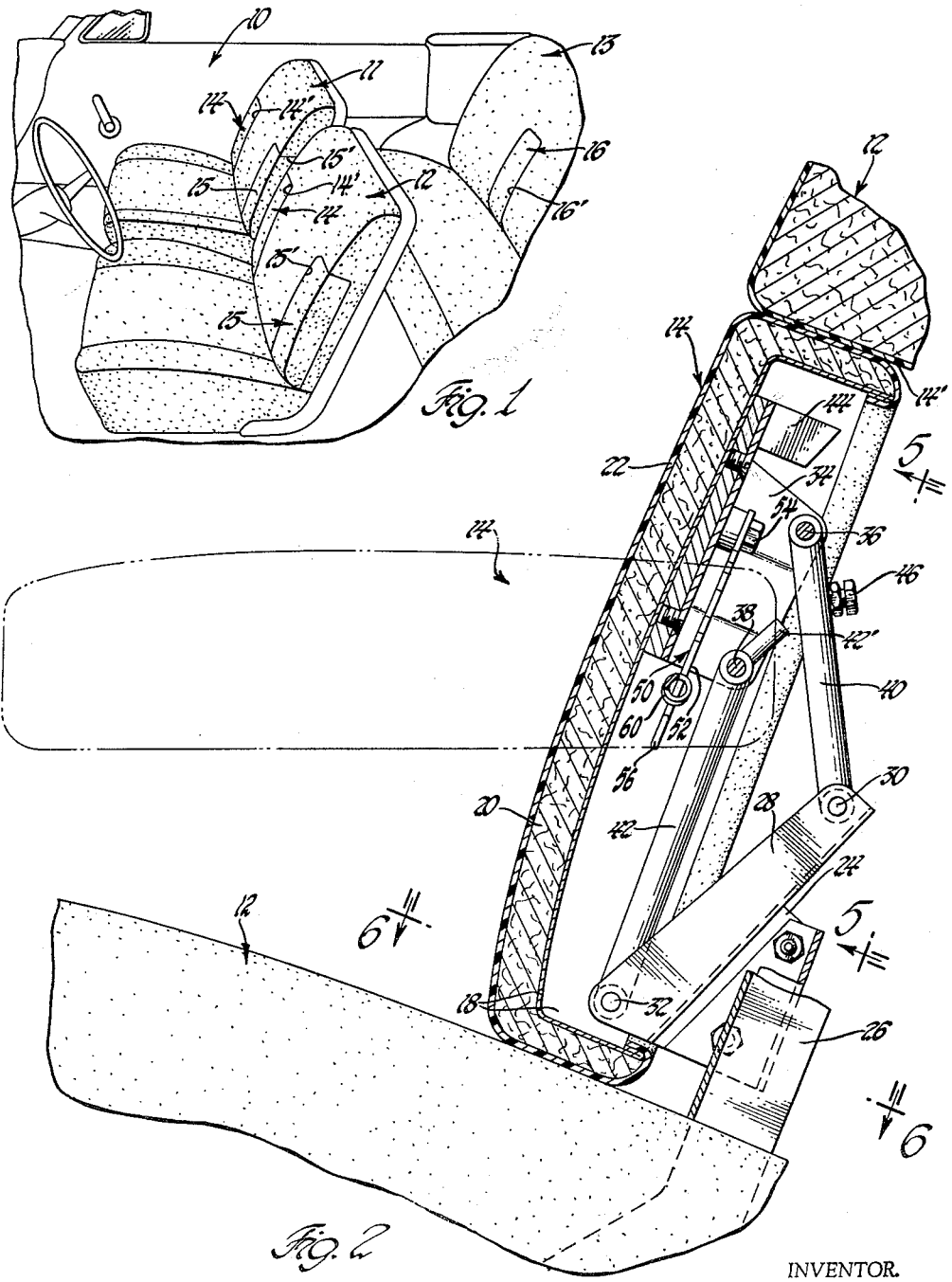
INVENTOR.
Charles W. Rei, Jr.
BY
C. E. James
ATTORNEY Feb. 2, 1965   C. W. REI, JR   3,168,346
PULL-UP ARM REST FOR VEHICLE SEATS
Filed May 13, 1963   3 Sheets-Sheet 2

INVENTOR.
Charles W. Rei, Jr.
BY
C. C. James
ATTORNEY

Feb. 2, 1965 C. W. REI, JR 3,168,346
PULL-UP ARM REST FOR VEHICLE SEATS
Filed May 13, 1963 3 Sheets-Sheet 3

INVENTOR.
Charles W. Rei, Jr.
BY
E. E. James
ATTORNEY

3,168,346
PULL-UP ARM REST FOR VEHICLE SEATS
Charles W. Rei, Jr., Warren, Mich., assignor to General Motors Corporation, Detroit, Mich., a corporation of Delaware
Filed May 31, 1963, Ser. No. 279,959
10 Claims. (Cl. 297—113)

This invention relates to seat structures and more particularly to a retractable arm rest for a vehicle seat.

In the past, vehicle seats have been provided with an arm rest movable between a recessed or retracted position and an extended horizontal position above the seat cushion. In some, the arm rests have been hinged on the sides of the seat back and swingable upwardly to a substantially horizontal position maintained by a strut or post swingable to a detent engaged position relative to the extended arm rest. Recently vehicle seats have been provided with center arm rests suitably mounted by a quadrilateral linkage and movable from a seat recessed position to an extended position. Such center arm rest structures usually have a cover movable to close the recess above the extended arm rest and thereby conceal the arm rest linkage. Such previous folding arm rests generally require awkward two-handed or crossbody operation by a seated vehicle occupant.

The instant invention contemplates an arm rest mounted by a simple quadrilateral linkage for easy one-handed upward movement from a seat back recessed position to an extended position maintained by a simple, easily released latch mechanism. While the invention has particular application to a vehicle seat and is herein shown and described in such an environment for illustrative purposes, the invention is applicable to other seats having retractable arm rests.

The foregoing and other objects and advantages of the invention will be apparent from the following description of the illustrative embodiment having reference to the accompanying drawings, in which:

FIGURE 1 is a perspective view of a portion of the passenger compartment of an automotive vehicle having front and rear seats incorporating the retractable arm rests of the invention;

FIGURE 2 is a fragmentary view of the driver's seat in side elevation with portions broken away and sectioned substantially in the plane indicated at 2—2 of FIGURE 5 to show the right arm rest and its mounting linkage in their retracted positions;

Figures 5, 6:
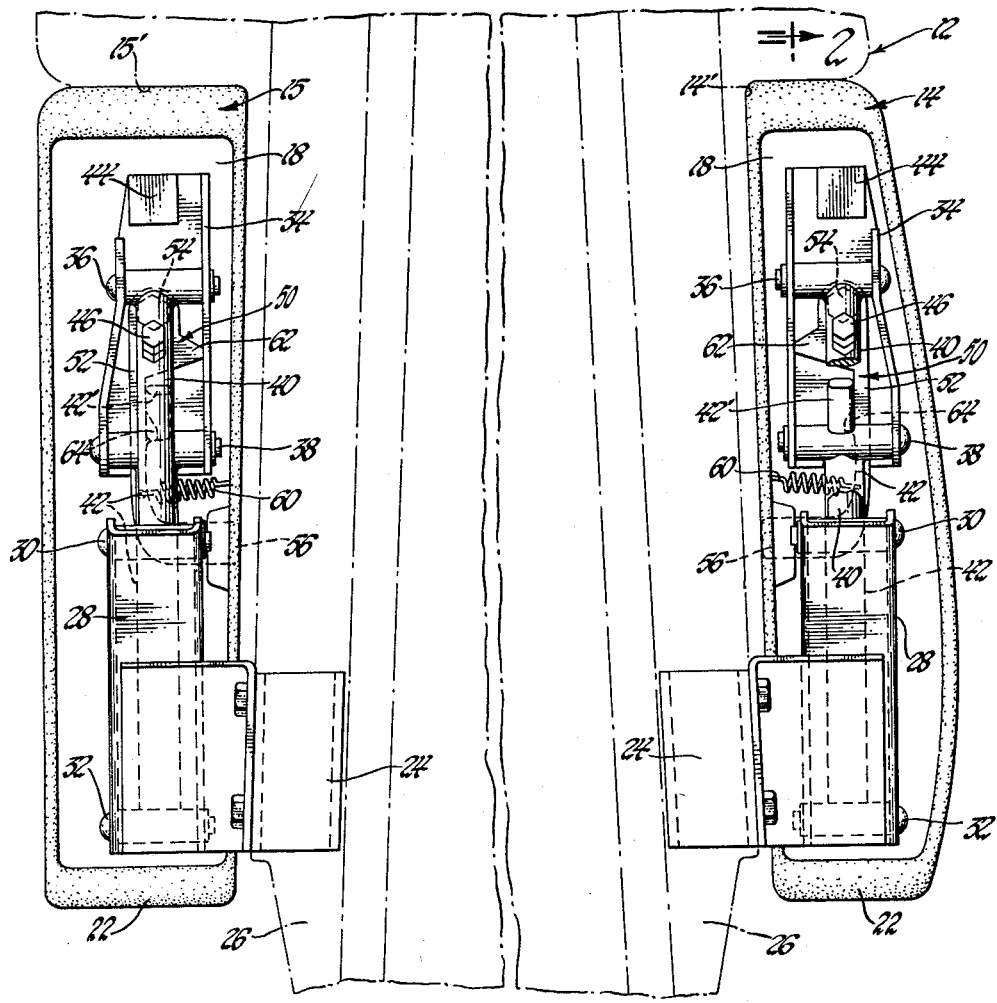

FIGURE 5 is a view showing both the right and left arm rest of the driver's seat and their mounting linkages in retracted rear elevation as indicated by the arrows at 5—5 in FIGURE 2, with the seat back and frame being shown in broken phantom lines; and FIGURE 6 is a fragmentary sectional view taken substantially in the plane indicated at 6—6 of FIGURE 2 and further illustrates the mounting of the right arm rest and its supporting bracket on the back frame of the driver's seat.

Referring more particularly to FIGURE 1, an interior passenger compartment of an automotive vehicle body is indicated generally by the reference numeral 10. This compartment is provided with two substantially identical bucket or sports type front seats 11 and 12 and a rear bench type seat 13. The two front seats are each provided with right and left hand arm rests 14 and 15 foldable to retracted positions within recesses 14' and 15' formed in opposite front sides of the cushioned seat backs. The rear seat 13 is similarly provided with a center arm rest 16 foldable to a retracted position within a seat back recess provided at 16'.

In accordance with the invention, each of the several arm rests 14, 15 and 16 is mounted by a quadrilateral linkage for swinging movement from its retracted position to a substantially horizontal extended position spaced above the seat cushion. In moving to this extended position, the retracted lower portion of each arm rest is swung upwardly and extends forwardly from the seat back and the retracted upper portion of the arm rest is swung downwardly within the seat back recess to substantially conceal the arm rest supporting linkage. Except for the provision of right, left and center arm rests and of corresponding arm rest supporting brackets and link members, each of the several arm rests shown in FIGURE 1 are essentially the same. The following description of the right arm rest 14 of the driver's seat shown in FIGURES 2-6 is thus similarly applicable to the other arm rests and their supporting structures.

Figure 3:
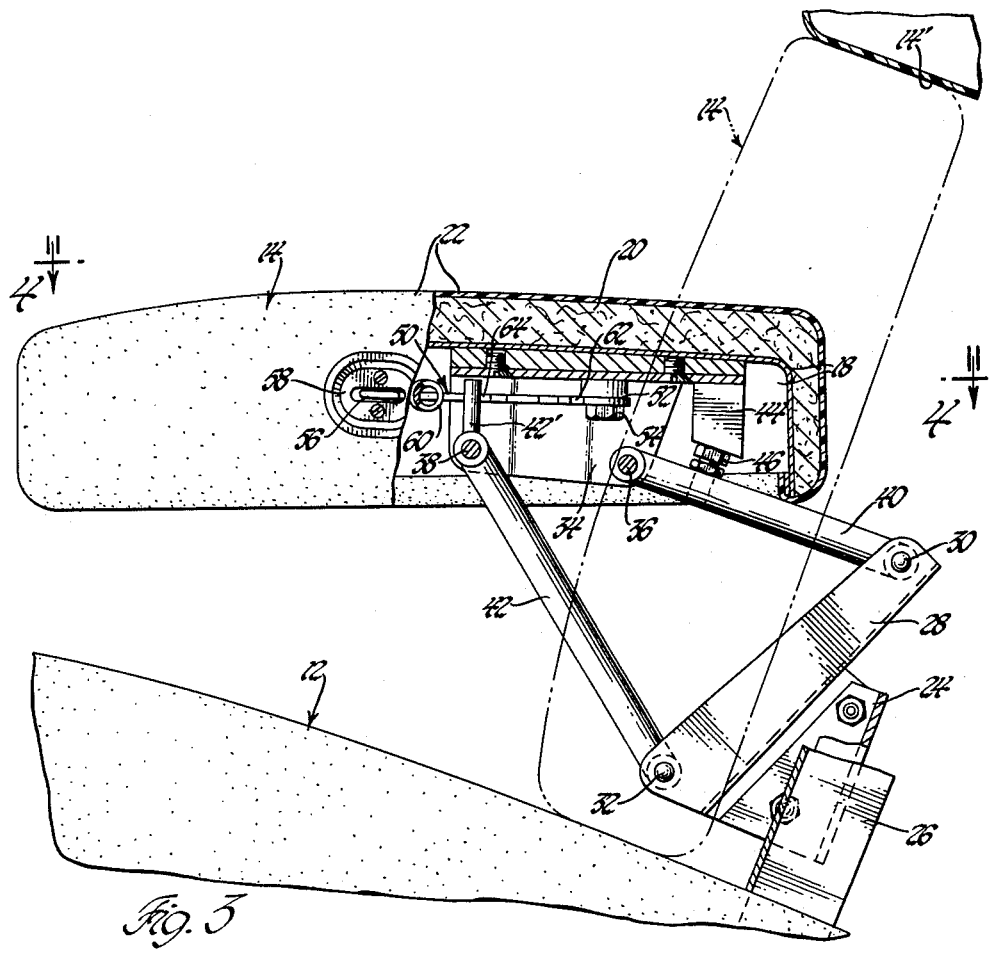
FIGURE 3 is a view similar to FIGURE 2 with portions broken away and sectioned to show the right arm rest and its mounting linkage in their extended locked positions.
Figure 4:
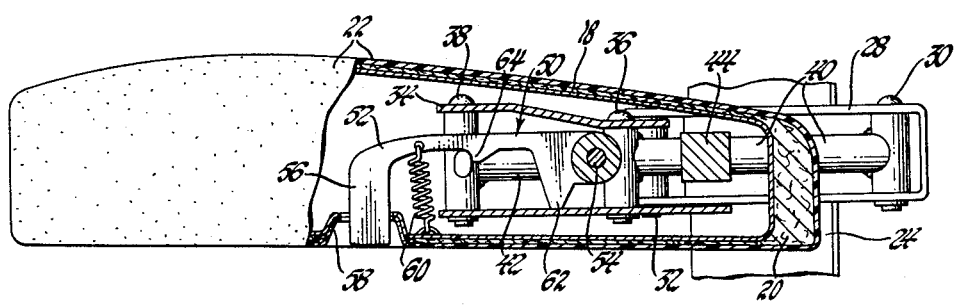
FIGURE 4 is a fragmentary view of the right arm rest in plan elevation and partially broken away and sectioned to show its extended linkage substantially in the plane indicated at 4—4 of FIGURE 3.

As best seen in FIGURES 2-4, the arm rest 14 comprises a dished inner housing 18 which is outwardly padded at 20 and covered by a suitable fabric 22. The inner housing 18 defines an elongated recess opening to the seat back in its retracted position and cooperating therewith to define a linkage mounting chamber. The quadrilateral linkage supporting the arm rest comprises a bracket 24 secured to an adjacent seat back frame member 26. The bracket 24 has a channeled portion 28 defining a fixed link extending obliquely upwardly and rearwardly of the lower portion of the seat back recess 14'. The opposite ends of the channeled link portion 28 supports two transverse pivot pins 30 and 32. A second channeled bracket 34 is secured to the arm rest inner housing within the upper retracted, rearward extending end of the arm rest recess. Two pivot pins 36 and 38 extend transversely of the bracket 34 and define a movable link of shorter dimension than that of the fixed link bracket member 24.

A link 40 is journaled at opposite ends on the pivot pin 30 carried by the upper end of the fixed link bracket portion 28 and on the pin 36 carried by the upper retracted and extended rear end of the arm rest bracket 34. The pivot pins 32 and 38 similarly journal opposite ends of a link 42 slightly longer than link 40. The links 40 and 42 thus serve to swing the arm rest with respect to the fixed lower bracket 24. An abutment member 44 carried by the arm rest bracket 34 engages a stop screw 46 which is threadably mounted intermediate the ends of the link 40 and adjustable to establish the desired extended position of the arm rest. Such engagement precludes further forward swinging movement of the arm rest beyond the stop screw established extended position.

Movement of the arm rest to its extended position is effected simply by lifting the lower portion of the retracted arm rest upwardly and forwardly from its retracted position. Such initial lifting carries the link 42 through a vertical overcenter position with respect to the pivot pin 32. Thereafter the weight of the arm rest acts to carry the arm rest to its stop limited extended position.

In the illustrative embodiment, a latch mechanism 50 is carried by the arm rest and latchably engages an angled extension 42' of the link 42 to maintain the arm rest in its extended position. This latch mechanism comprises a latch lever 52 pivoted at 54 for swinging movement transversely of the arm rest bracket 34. The end of the latch lever 52 distal from its pivotal mounting has an operating extension 56 which projects laterally outwardly through a slotted plate 58 secured to the inside face of the arm rest. A spring 60 is secured to the inner housing member 18 and tensively biases the latch lever in a counterclockwise direction as viewed in FIGURE 4. A boss 62 formed on the latch lever adjacent its pivoted end is engageable with the bracket 34 to limit such spring biased movement and to establish a normal latching position for the lever 52. Intermediate its ends, the latch lever has a boss 64 defining a tapered ramp on one side slidably engageable with the extension 42' of the link 42 as it approaches its extended position. Such ramp engagement swing the latch lever against the biasing action of the spring until the link extension passes beyond the boss 64. The opposite side of the boss 64 defines a shoulder engageable with the link extension 42' to latch and maintain the arm rest in its extended position.

Movement of the arm rest to its retracted position is effected by first depressing the push button provided by the latch lever extension 56, thereby swinging the latching lever out of engagement with the link extension 42', and then moving the arm rest upwardly and rearwardly to its retracted position by pulling or pushing rearwardly on the forward edge of the arm rest.

From the foregoing description, it will be seen that the invention provides an easily operated retractable arm rest having a relatively simple, concealed mounting linkage and adapted for use in vehicle and other types of seats. It will be further apparent that various changes and modifications might be made in and from the disclosed illustrative embodiment without departing from the spirit and scope of the invention as defined in the following claims.

I claim:

1. In a vehicle seat including a seat back having a forwardly facing recess, an arm rest movable between a retracted position occupying said seat back recess and a horizontal position extending forwardly from said seat back, a first bracket member secured to said seat back and having pivotal axes spaced vertically of the lower portion of the seat back recess to define a fixed link member, a second bracket member secured to and providing pivotal axes spaced vertically of the retracted upper end portion of said arm rest and defining a second link member of shorter dimension than said first bracket member, a third link member pivotally interconnecting the lower pivot of said fixed bracket member and the lower retracted and forward extended pivot of said second bracket member, a fourth link member pivotally interconnecting the upper pivot of said fixed bracket link and the upper retracted and rearward extended pivot of the second bracket member, and abutment means engageable with at least one of said link members to limit and prevent further swinging movement of the arm rest upon reaching its extended position.

2. The combination set forth in claim 1 further comprising latch means including a latch member engageable with one of the link members to lock said arm rest in its extended position.

3. In the combination set forth in claim 2, said latch means further including spring means normally biasing said latch member toward its link locking position, said latch member having an extension projecting outwardly of said arm rest and manually actuated against the biasing action of said spring means to release said other link member thereby permitting the arm rest to be swung to its retracted position within the seat back recess.

4. In a vehicle seat including a seat back having a forwardly facing recess, an arm rest movable between a retracted position occupying said seat back recess and a horizontal position extending forwardly from said seat back recess, a first bracket member secured to said seat back within the lower portion of said recess and defining a vertically and rearwardly inclined fixed link member, a second bracket member secured to the upper rear underside of said arm rest in its retracted position and movable therewith in a downward arc during movement of the arm rest to its extended position, said second bracket member defining a second link member of shorter dimension than said fixed link bracket member, a third link member pivotally and swingably interconnecting the lower retracted and forward extended end of said arm rest bracket member to the lower end of said fixed bracket member, a fourth link member pivotally interconnecting the upper retracted and rearward extending end of the arm rest bracket member to the upper end of said fixed bracket member and abutment means on one of said bracket members engageable with one of said third and fourth link members to limit and prevent further movement therebetween when said arm rest reaches its extended position.

5. In the combination set forth in claim 4, latch means including a latch member mounted within said arm rest and engageable with one of said third and fourth link members to lock said arm rest in its extended position, spring means normally biasing said latch member toward its arm rest locking position, and said latch member having a portion projecting outwardly of the arm rest for actuation against the biasing action of said spring means to release said latch means thereby permitting the arm rest to be swung to its retracted position within the seat back recess.

6. In a vehicle seat including a seat back having a forwardly facing recess, an arm rest having a retracted vertically inclined position occupying said recess, a quadrilateral linkage mounting said arm rest on said back for swinging movement from its retracted to a horizontal position extending forwardly from said seat back whereby the lower retracted edge of said arm rest is carried upwardly and forwardly spaced from the seat back and the upper retracted edge of the arm rest is swung downwardly within said recess, said linkage including a first bracket secured to said seat back within the lower portion of said recess and defining a vertically and rearwardly inclined fixed link member, a second bracket secured to the upper rear underside of said arm rest in its retracted vertically inclined position and movable therewith in a downward arc during movement of the arm rest to its extended horizontal position, said second bracket member defining a second link member of shorter dimension than said fixed link, a third link member pivotally and swingably interconnecting the lower end of the fixed bracket member with the lower retracted and forward extending end of the arm rest bracket member, a fourth link member pivotally interconnecting the upper end of the fixed bracket member and the upper retracted and rearward extending end of the arm rest bracket member, and abutment means engageable to limit and prevent further relative movement between said link members when said arm rest reaches its extended position.

7. The combination set forth in claim 6 further comprising latch means including a latch member engageable with one of said third and fourth link members to lock said arm rest in its extended position, spring means normally biasing said latch member toward its arm rest locking position, and an extension of said latch member projecting outwardly of said arm rest and operable against the biasing action of said spring means to release said latch means thereby permitting the arm rest to be swung to its retracted position within the seat back recess.

8. In an individual vehicle seat including a seat back having forwardly facing recesses formed in laterally opposite sides thereof, a pair of arm rests each having a retracted position occupying one of the seat back recesses, quadrilateral linkage means mounting each arm rest for movement between its retracted position and a horizontal position wherein the retracted lower portion of each arm rest is swung upwardly and extends forwardly from the seat back and the retracted upper portion of the arm is swung downwardly within its mounting recess, each of said linkage means comprising a first bracket member secured to said seat back and having pivotal axes spaced vertically of the lower portion of the seat back recess to define a fixed link member, a second bracket member secured to and providing pivotal axes spaced vertically of the retracted upper portion of said arm rest and defining a second link member of shorter dimension than said first bracket member, a third link member pivotally interconnecting the lower pivot of said fixed bracket member and the lower retracted and forward extended pivot of said second bracket member, a fourth link member pivotally interconnecting the upper pivot of said fixed bracket link and the upper retracted and rearward extended pivot of the second bracket member, and abutment means engageable with each of said third and fourth link members to limit and prevent further swinging movement when each arm rest reaches its extended position.

9. In an individual vehicle seat including a seat back having forwardly facing recesses formed in laterally opposite sides thereof, a pair of arm rests each having a retracted position occupying one of said seat back recesses, quadrilateral linkage means mounting each of said arm rests for movement between its retracted position and a horizontal position wherein the retracted lower portion of each arm rest is swung upwardly to extend forwardly from the seat back and the retracted upper portion of the arm is swung downwardly within its mounting recess, each of said linkage means comprising a first bracket member secured to said seat back and having pivotal axes spaced vertically of the lower portion of the seat back recess to define a fixed link member, a second bracket member secured to and providing pivotal axes spaced vertically of the retracted upper portion of said arm rest and defining a second link member of shorter dimension than said first bracket member, a third link member pivotally interconnecting the lower pivot of said fixed bracket member and the lower retracted and forward extended pivot of said second bracket member, a fourth link member pivotally interconnecting the upper pivot of said fixed bracket link and the upper retracted and rearward extended pivot of the second bracket member, cooperating abutment means on said arm rest and one of said third and fourth link members and engageable to limit and prevent further downward swinging movement therebetween when said arm rest reaches its extended position, and latch means including a latch member engageable with the other one of said third and fourth link members to lock said arm rest in its extended position, spring means normally biasing said latch member to its locking position and said latch member having a push button extension projecting outwardly of said arm rest and being depressible against the biasing action of said spring means to release said other link member thereby permitting the arm rest to be swung to its retracted position within the seat back recess.

10. In a seat including a cushioned seat back having a forwardly facing recess, an arm rest having a retracted position occupying said seat back recess and comprising an outwardly upholstered housing defining an inner recess facing the seat back recess when in its retracted position, quadrilateral linkage means mounting said arm rest for swinging movement between its retracted position and a horizontal position wherein the retracted lower portion of the arm rest is swung upwardly and extends forwardly from the seat back and the retracted upper portion of the arm rest is swung downwardly within the seat back recess, said linkage including a first bracket secured to said seat back within the lower portion of the seat back recess and defining a vertically and rearwardly inclined fixed link member, a second bracket member secured within the upper recessed end portion of the retracted arm rest and defining a link member of relatively shorter dimension than said fixed link member and movable with the arm rest in a downward arc during movement to its extended horizontal position, a third link member pivotally and swingably interconnecting the lower end of said fixed bracket link member with the lower retracted and forward extended end of said arm rest mounted bracket member, a fourth link member pivotally interconnecting the upper end of said fixed bracket link member and the upper retracted and rearward extended end of the arm rest mounted bracket member, abutment means on one of said bracket members engageable with one of said third and fourth link members to limit swinging movement of said arm rest to its extended position, and latch means including a latch member engageable with one of said swingable link members to lock said arm rest in its extended position, spring means normally biasing said latch member to its locking position, and said latch member having a portion projecting outwardly of said arm rest housing and manually operable against the biasing action of said spring means to release said latch means thereby permitting the arm rest to be swung to its retracted position within the seat back recess.

References Cited in the file of this patent

UNITED STATES PATENTS

| | | |
|---|---|---|
| 1,894,621 | Lehman | Jan. 17, 1933 |
| 2,965,158 | Fletcher | Dec. 20, 1960 |

FOREIGN PATENTS

| | | |
|---|---|---|
| 472,478 | Great Britain | Sept. 20, 1937 |